(12) United States Patent
Gao et al.

(10) Patent No.: US 11,714,154 B2
(45) Date of Patent: Aug. 1, 2023

(54) USING RECURSIVE PHASE VECTOR SUBSPACE ESTIMATION TO LOCALIZE AND TRACK CLIENT DEVICES

(71) Applicant: Cisco Technology, Inc., San Jose, CA (US)

(72) Inventors: Zhigang Gao, Twinsburg, OH (US); Matthew A. Silverman, Shaker Heights, OH (US); Fred J. Anderson, Lakeville, OH (US); Huaiyi Wang, North Royalton, OH (US)

(73) Assignee: Cisco Technology, Inc., San Jose, CA (US)

( * ) Notice: Subject to any disclaimer, the term of this patent is extended or adjusted under 35 U.S.C. 154(b) by 240 days.

(21) Appl. No.: 16/867,410

(22) Filed: May 5, 2020

(65) Prior Publication Data

US 2021/0349171 A1  Nov. 11, 2021

(51) Int. Cl.
*G01S 3/14* (2006.01)
*G01S 3/74* (2006.01)
*G01S 5/02* (2010.01)

(52) U.S. Cl.
CPC .............. *G01S 3/143* (2013.01); *G01S 3/74* (2013.01); *G01S 5/0284* (2013.01)

(58) Field of Classification Search
CPC ........... G01S 3/143; G01S 3/74; G01S 5/0284
USPC ............ 342/442, 432, 368, 202, 22, 146, 90
See application file for complete search history.

(56) References Cited

U.S. PATENT DOCUMENTS

| 7,436,358 | B2 | 10/2008 | Tanaka |
| 9,804,256 | B2 | 10/2017 | Jamieson et al. |
| 9,823,330 | B2 | 11/2017 | Hart et al. |
| 10,433,274 | B2 | 10/2019 | Jamieson et al. |
| 10,595,165 | B2 | 3/2020 | Zhang et al. |
| 2004/0027274 | A1* | 2/2004 | Driessen ............... G01S 13/726 342/107 |
| 2009/0079634 | A1* | 3/2009 | Rose .................... G01S 5/12 342/442 |
| 2009/0231196 | A1* | 9/2009 | Niu ...................... H04B 7/0617 342/372 |
| 2009/0315760 | A1* | 12/2009 | Mousavi Bafrooei ...................... H01Q 1/3275 342/359 |

(Continued)

OTHER PUBLICATIONS

Tran et al. "Improving Infrastructure-Based Indoor Positioning Systems with Device Motion Detection," IEEE, Mar. 11-15, 2019.

*Primary Examiner* — Bo Fan
(74) *Attorney, Agent, or Firm* — Patterson + Sheridan, LLP

(57) ABSTRACT

Techniques for determining a location of a client device using recursive phase vector subspace estimation are described. One technique includes receiving a plurality of angle-of-arrival (AoA) measurements from a plurality of access points (APs). Each AoA measurement includes a plurality of entries for phase values measured from a signal received from a client device at the plurality of APs. At least one AoA measurement of the plurality of AoA measurements that includes at least one of: (i) one or more entries with missing phase values and (ii) one or more entries with erroneous phase values is identified, based on a recursive phase estimation. The plurality of AoA measurements are updated based on the identified at least one AoA measurement. The location of the client device is determined, based on the updated plurality of AoA measurements.

21 Claims, 10 Drawing Sheets

(56) References Cited

U.S. PATENT DOCUMENTS

| | | | |
|---|---|---|---|
| 2013/0229309 A1* | 9/2013 | Thomas | H04B 7/0478 342/368 |
| 2018/0007655 A1 | 1/2018 | Raghupathy et al. | |
| 2020/0011956 A1* | 1/2020 | Zarubica | G01S 3/46 |

* cited by examiner

USING RECURSIVE PHASE VECTOR SUBSPACE ESTIMATION TO LOCALIZE AND TRACK CLIENT DEVICES

TECHNICAL FIELD

Embodiments presented in this disclosure generally relate to wireless communications and, more specifically, to techniques for determining a location of a client device using recursive phase vector subspace estimation.

BACKGROUND

Current location techniques use phase vectors measured at multiple multi-antenna wireless devices (e.g., access points (APs)) to conduct Angle-of-Arrival (AoA) localization. By measuring concurrent AoA at the array antennas of multiple wireless devices, it is possible to achieve room-level (1-5 meters) or even sub-meter location accuracy for the location of a client device (e.g., client station (STA)). However, location techniques that leverage AoA measurements may suffer from accuracy problems when packets are missed (e.g., not detected) by wireless devices, when there are erroneous AoA measurements, and/or when the client device is mobile.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
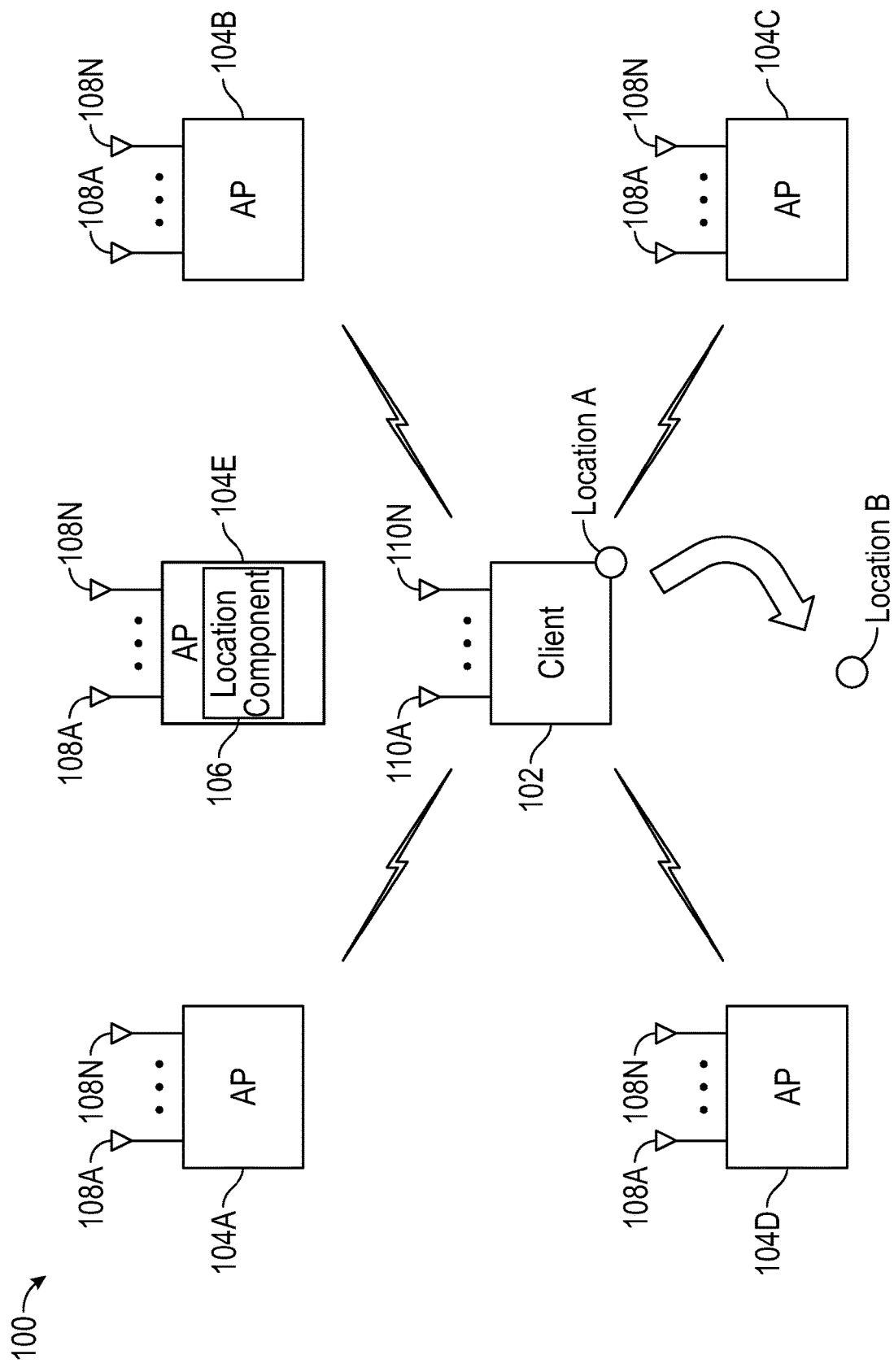
FIG. 1 illustrates an example wireless network, according to one embodiment.

One embodiment presented in this disclosure includes a computer-implemented method performed by an apparatus. The computer-implemented method includes receiving a plurality of angle-of-arrival (AoA) measurements from a plurality of access points (APs). Each AoA measurement includes a plurality of entries for phase values measured from a signal received from a client device at the plurality of APs. The computer-implemented method also includes identifying, based on a recursive phase estimation, at least one AoA measurement of the plurality of AoA measurements that includes at least one of: (i) one or more entries with missing phase values and (ii) one or more entries with erroneous phase values. The computer-implemented method further includes updating the plurality of AoA measurements based on the identified at least one AoA measurement, and determining a location of the client device, based on the updated plurality of AoA measurements.

Another embodiment presented in this disclosure includes a computing system. The computing system includes a processor and a memory storing a program executable by the processor to perform an operation. The operation includes receiving a plurality of angle-of-arrival (AoA) measurements from a plurality of access points (APs). Each AoA measurement includes a plurality of entries for phase values measured from a signal received from a client device at the plurality of APs. The operation also includes identifying, based on a recursive phase estimation, at least one AoA measurement of the plurality of AoA measurements that includes at least one of: (i) one or more entries with missing phase values and (ii) one or more entries with erroneous phase values. The operation further includes updating the plurality of AoA measurements based on the identified at least one AoA measurement, and determining a location of the client device, based on the updated plurality of AoA measurements.

Yet another embodiment presented in this disclosure includes a non-transitory computer readable medium having program instructions embodied therewith. The program instructions are executable by a processor to perform an operation. The operation includes receiving a plurality of angle-of-arrival (AoA) measurements from a plurality of access points (APs). Each AoA measurement includes a plurality of entries for phase values measured from a signal received from a client device at the plurality of APs. The operation also includes identifying, based on a recursive phase estimation, at least one AoA measurement of the plurality of AoA measurements that includes at least one of: (i) one or more entries with missing phase values and (ii) one or more entries with erroneous phase values. The operation further includes updating the plurality of AoA measurements based on the identified at least one AoA measurement, and determining a location of the client device, based on the updated plurality of AoA measurements.

EXAMPLE EMBODIMENTS

Some of the issues that can impact the location accuracy of AoA-based location techniques include, but are not limited to, missing packets, erroneous phase values, etc. For example, in scenarios where there is a high density of client devices (e.g., above a threshold number of client devices)

and low client transmit power (e.g., below a threshold transmit power level), the wireless propagation environment can lead to sporadic packet miss detection for certain AP(s) involved in the AoA-based location technique and/or erroneous phase measurements for certain antennas of certain AP(s) involved in the AoA-based location technique. Sporadic packet miss detection may be reflected by partial phase vectors (e.g., phase vectors having one or more missing phase values). Erroneous phase measurements may be reflected by one or more entries of a phase vector having values that satisfy a predetermined condition (e.g., reported phase value being below a particular threshold, reported phase value deviates largely (above a threshold) from its true value, reported phase value may not be indicative of a real measurement (the value may not make sense), etc.).

One conventional technique for mitigating these issues involves discarding the partial phase vectors and the phase vectors with erroneous measurements from the AoA-based location technique. Discarding phase vectors, however, removes any useful information that may be contained within the phase vectors. For example, in some cases, the same phase vectors that have missing and/or erroneous values may also have entries with valid phase measurements. Another conventional technique involves replacing missing phase entries with zeros to obtain an observation matrix for singular value decomposition (SVD). However, forming an observation matrix in this manner can lead to a highly based estimation for the true phase vector.

Another issue that impact location accuracy of AoA-based location techniques is mobility of a client device. Conventional location techniques, for example, generally collect multiple phase vectors over time for each AP, assuming that the phase vectors are highly correlated for static client devices. However, such an assumption may not be true for client devices that are moving. As a result, conventional AoA-based location techniques that combine several phase vectors over time to improve location accuracy may not be sufficient for mobile clients, since the phase vectors will decorrelate over time as the client device moves.

Accordingly, embodiments herein describe performing an iterative phase vector subspace estimation to compensate for missed packets and/or erroneous AoA measurements encountered when performing AoA localization. As described below, a wireless device (e.g., central AP) can use a location component to measure concurrent phase vectors at the array antennas of multiple wireless devices (e.g., multiple APs) to conduct AoA localization. In one embodiment, the location component can generate a phase observation matrix based on the values reported by the array antennas of the multiple wireless devices. The location component can then perform a recursive phase vector subspace estimation (e.g., to estimate the underlying phase vector subspace), based at least in part on the phase observation matrix. The recursive phase vector subspace estimation may involve, for each input phase vector that is available, computing an estimated subspace matrix and using the estimated subspace matrix to generate (or reconstruct) an estimated phase vector corresponding to the input phase vector.

The recursive phase vector estimation may further involve comparing the estimated phase vector to the input phase vector to determine if there are outlier entries (e.g., erroneous entries satisfying a predetermined condition) present in the input phase vector. If the location component determines that there are outlier entries present, then the location component can infer that the estimated subspace matrix contains invalid contributions from an invalid phase measurement. The location component can then remove these outlier entries present in the input phase vector and treat them as missing entries in the subsequent iteration of the recursive phase vector estimation. The recursive phase vector estimation may continue in this manner until a predetermined condition is satisfied (e.g., no remaining outlier entries are identified). In this manner, the location component can update the estimated subspace matrix and send an indication of the reconstructed phase vectors (e.g., to the central AP). In this manner, embodiments herein can compensate for missed packets and/or erroneous AoA measurements encountered when performing AoA localization.

FIG. 1 illustrates a wireless network 100 in which one or more techniques described herein can be implemented, according to one embodiment. The wireless network 100 includes APs 104 A-E and a client device 102. The wireless network 100 may be deployed in an indoor environment (e.g., shopping center, retail store (grocery, hardware, department, etc.), warehouse, convention center, conference center, sports arena, stadium, and the like).

An AP is generally a fixed station that communicates with the client devices and may also be referred to as a base station, wireless device, wireless node, or some other terminology. A client device may be fixed or mobile and also may be referred to as a mobile STA, a client, a STA, a wireless device, a wireless node, user device, or some other terminology. Although one client device 102 is depicted, note that the wireless network 100 can include one or more client devices 102. Example client devices 102 include, but are not limited to, smart phones, feature phones, tablet computers, laptop computers, Internet of Things (IoT) devices, and the like.

In this particular embodiment, the AP 104E is generally a central controller that provides coordination and control for the APs 104 A-D. For example, the AP 104E can handle adjustments to radio frequency power, channels, authentication, and security for the APs 104 A-D, perform localization to track the client device 102 using one or more antennas of the APs 104 A-D, and the like. The AP 104E may communicate with the AP(s) 104 A-D directly or indirectly via a wireless or wireline backhaul. As used herein, the central controller may also be referred to as a central AP, controller, master AP, etc. Note that although FIG. 1 depicts AP 104E as the master AP, any of the APs 104-D can be configured as the master AP.

In one embodiment, one or more of the APs 104 A-E may perform AoA location to identify the location of the client device 102. For example, each AP 104 may include any number of antennas 108 A-N (also referred to as antenna elements or antenna array). Each AP 104 may include a transmitter and receiver (collectively referred to as a transceiver). The receiver at the AP 104 may be used to identify a location of the client device 102 based on signals received from the client device 102. The transceiver at the AP 104 may be used to transmit signals to the client device 102 to enable the client device 102 to determine its location. The client device 102 may also include any number of antennas 110 A-N (also referred to as antenna elements or antenna array).

For AoA localization, the client device 102 may transmit a signal (e.g., a beacon signal) that may be received by one or more APs 104 A-E. The AP(s) 104 may determine a received signal strength indicator (RSSI) and/or an AoA associated with the signal. The master AP (e.g., AP 104E) may determine a location of the client device 102, based on the RSSI and/or AoA determined from the other APs 104 A-D in the wireless network 100. For example, using the signal that is received at the antenna array of an AP 104, the AoA of the client device 102 and the AP 104 can be estimated from the properties of the wireless channel. The AoA may be defined as an angle between the propagation direction of an incident wave and some reference direction. Each AP 104 may perform electronic switching between its antennas 108 to extract the angles of incidence.

In one embodiment, each AP 104 may switch through a portion of its antenna array (e.g., antennas 108) to obtain a vector of phases (also referred to as a phase vector) (e.g., one per switched antenna). Depending on the location of the client device 102, the vector of phases may change. If the antennas 108 are sufficiently closely spaced, the phase vector may be substantially similar to phase vectors at adjacent locations of the client device 102 but may be substantially different from phase vectors at other locations of the client device 102.

As noted above, conventional AoA-based location techniques may suffer from one or more phenomena (e.g., noise, interference, multipath, fading, etc.) that affects the accuracy of the AoA measurements. Such atmospheric phenomena can cause the AP(s) 104 to miss certain packets transmitted by the client device 102 and/or cause the AP(s) 104 to determine (e.g., compute) an erroneous AoA measurement based on the packets transmitted by the client device 102. Further, in some cases, the accuracy of the AoA measurements can be impacted by the mobility of the client device 102 (e.g., as the client device 102 moves from location A to location B).

To address this, the master AP (e.g., AP 104E) can use the location component 106 to compensate for missed packets and/or packets with erroneous values when performing AoA location to identify the location of the client device 102. The location component 106 can include software, hardware, or combinations thereof. In one embodiment, the location component 106 is configured to receive phase vectors from each of the APs 104 containing AoA measurements from the array antennas 108 A-N of that AP 104. Here, in particular, as the client device 102 moves from location A to location B, each AP 104 may measure the AoA of the signals from the client device 102 at the antenna elements of the array antennas 108 A-N. The master AP can collect multiple phase vectors from each AP 104 over the amount of time that the client device 102 is transitioning from location A to location B. In FIG. 1, each AP 104 may be properly selected by the master AP such that the client device 102 can be heard by all the APs 104. However, in some cases, sporadic, independent miss detection at each AP 104 and/or bad phase measurement at the array antennas 108 due to noise, interference, fading, etc., can still occur.

In some cases, due to the limited number of RF chains available at each AP 104, all entries or a subset (or partial number) of entries of the full phase vector may be collected through antenna switching in a sequential manner. The type of antenna switching may be based in part on the type of communication protocol employed within the wireless network 100. For example, inter-packet switching may be used for Wi-Fi and intra-packet switching may be used for Bluetooth Low Energy (BLE). As used herein, a full phase vector may refer to the phase measurements from all antenna elements of the array antenna 108.

Figure 2:
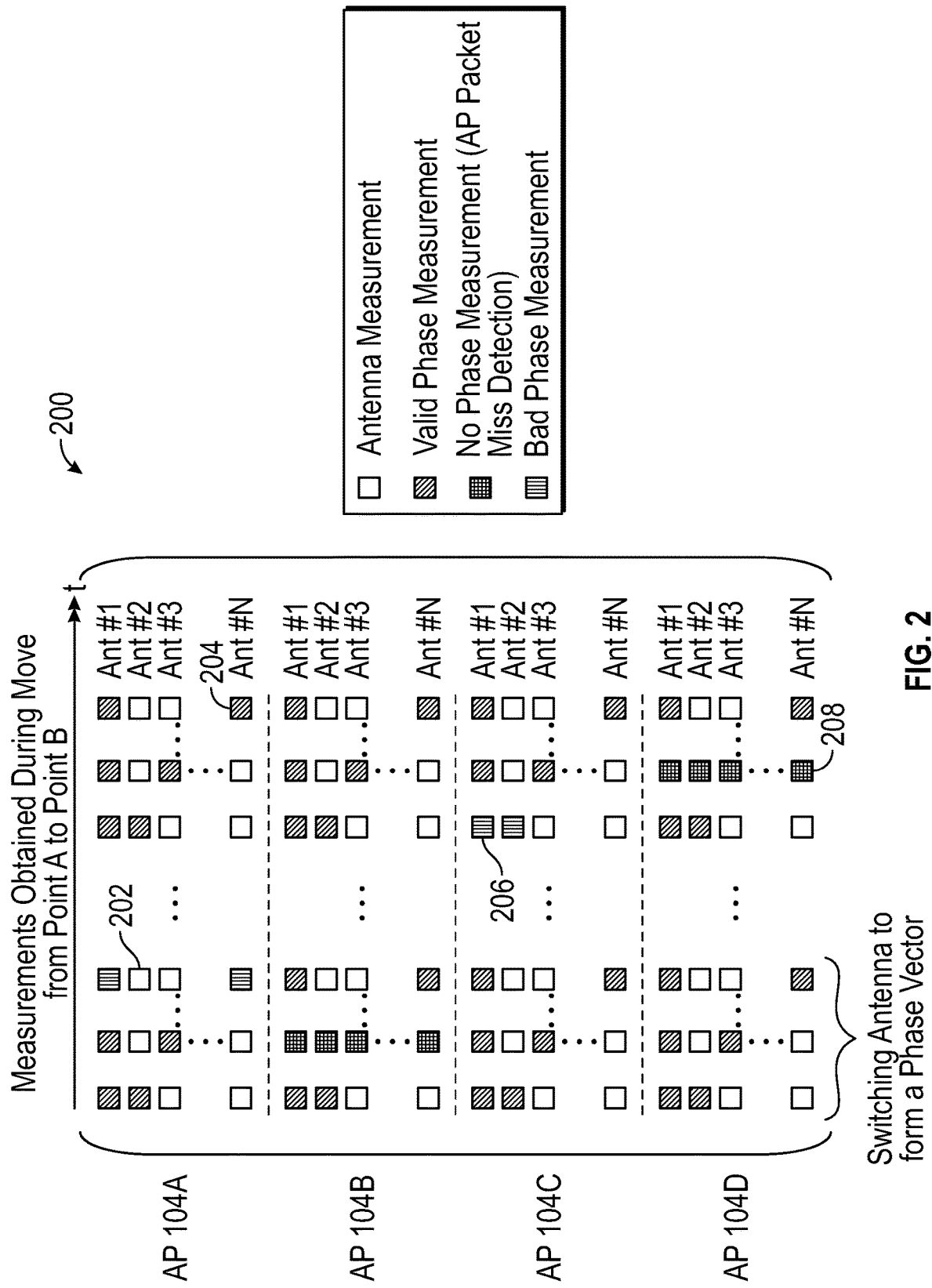
FIG. 2 illustrates an example phase observation matrix, according to one embodiment.

FIG. 2 illustrates an example phase observation matrix 200 from the perspective of the master AP, according to one embodiment. In one embodiment, the phase observation matrix 200 can be obtained based on the phase vectors collected from each AP 104 over a time window $[t_1, t_2]$ as the client device 102 moves from location A to location B, e.g., as depicted in FIG. 1.

As shown, each antenna 108 of each AP 104 A-D may perform an antenna measurement 202 as the client device moves from location A to location B. Each AP may perform antenna switching to form a phase vector. In some cases, the antenna measurement 202 may be a valid phase measurement (e.g., valid phase measurement 204) or an erroneous phase measurement (e.g., bad phase measurement 206). In some cases, the antenna measurement 202 may not include any phase measurement (e.g., no phase measurement 208). As noted, this can occur in an AP packet miss detection scenario. As described below, embodiments herein may use the phase observation matrix 200 to perform recursive phase vector estimation.

In general, because phase vectors measured over a limited time span are generally correlate to some extent, embodiments can leverage this to overcome the sporadic missing phase entries and erroneous phase measurements typically encountered in conventional location techniques through an iterative phase vector subspace estimation.

Assume, for example, that the client device mobility is very low (e.g., below a first threshold speed). In this case, the moving distance from location A to location B during the limited time span $[t_1, t_2]$ may be close to zero. Thus, from the perspective of each AP 104, the signal AoA from the client device 102 should stay constant and all its phase vectors collected over the whole time span $[t_1, t_2]$ should be fully correlated. If it is further assumed that the phase calculation process is ideal (e.g., free space propagation, no noise, no interference, no packet miss detection, no bad phase measurement, etc.), then the dimension of the underlying phase vector space for the phase observation matrix 200 is 1. Here, this dimension of "1" is the same for both the whole phase observation matrix 200 and its submatrix corresponding to the observation from a single AP.

Now, relaxing some of the above assumptions, assume that the client device 102 moves from location A at a moderate speed (e.g., at a second threshold speed, above the first threshold speed) at stops at location B when non-trivial decorrelation is detected between the phase vectors collected at these two points. In this case, the dimension of the underlying phase vector space for the phase observation matrix is "2." If the effect of multipath fading channel is also taken into consideration, then there may be additional interference dimensions due to the multipath components.

In general, however, given an observing time window (e.g., $[t_1, t_2]$) having a time span below a threshold amount of time, the underlying subspace for the phase observation matrix 200 can be assumed to be fixed and low-dimensional (e.g., below a threshold number of dimensions). Note, however, that this assumes that the number of collected phase vectors is greater than the dimension of the phase vector subspace. Phase vector measurements for a specific client device 102 at each AP 104 should be coherent, and thus belong to this measurement subspace. In this case, any missing entries can be characterized by a basis for this subspace, and any outlier measurement can be identified and filtered out. By identifying and approximating the underlying low-dimensional subspace from the phase observation matrix 200 (which includes erroneous and missed packets), embodiments can recursively reconstruct the missing entries and filter out the outlier entries using techniques, such as least squares estimation.

To estimate the underlying phase vector subspace, the location component 106 can use the correlation relationship among the phase vectors collected over the limited time span. For each input phase vector, the location component 106 can iterate through each row of the phase observation matrix 200 to update the corresponding row of the subspace matrix. The location component 106 can skip over missing entries since these entries contain zero information. The location component 106 may use a (pre-defined) decorrelation factor (k) to account for the decorrelation of phase vectors due to client mobility over time. In particular, the location component 106 may use the decorrelation factor k to discount the past observation, such that the presence of new dimension in the phase vector subspace can be timely captured.

The decorrelation factor k may depend on both the client mobility and system geometry. If the decorrelation factor k is too small, the information contribution from past observations may be ignored. On the other hand, if the decorrelation factor k is too large, the response of the system to changes in the underlying subspace may be slow. In general, if the upper limit of the client speed and the AP deployment is known, the decorrelation factor u can be determined from simulation.

Figure 3:
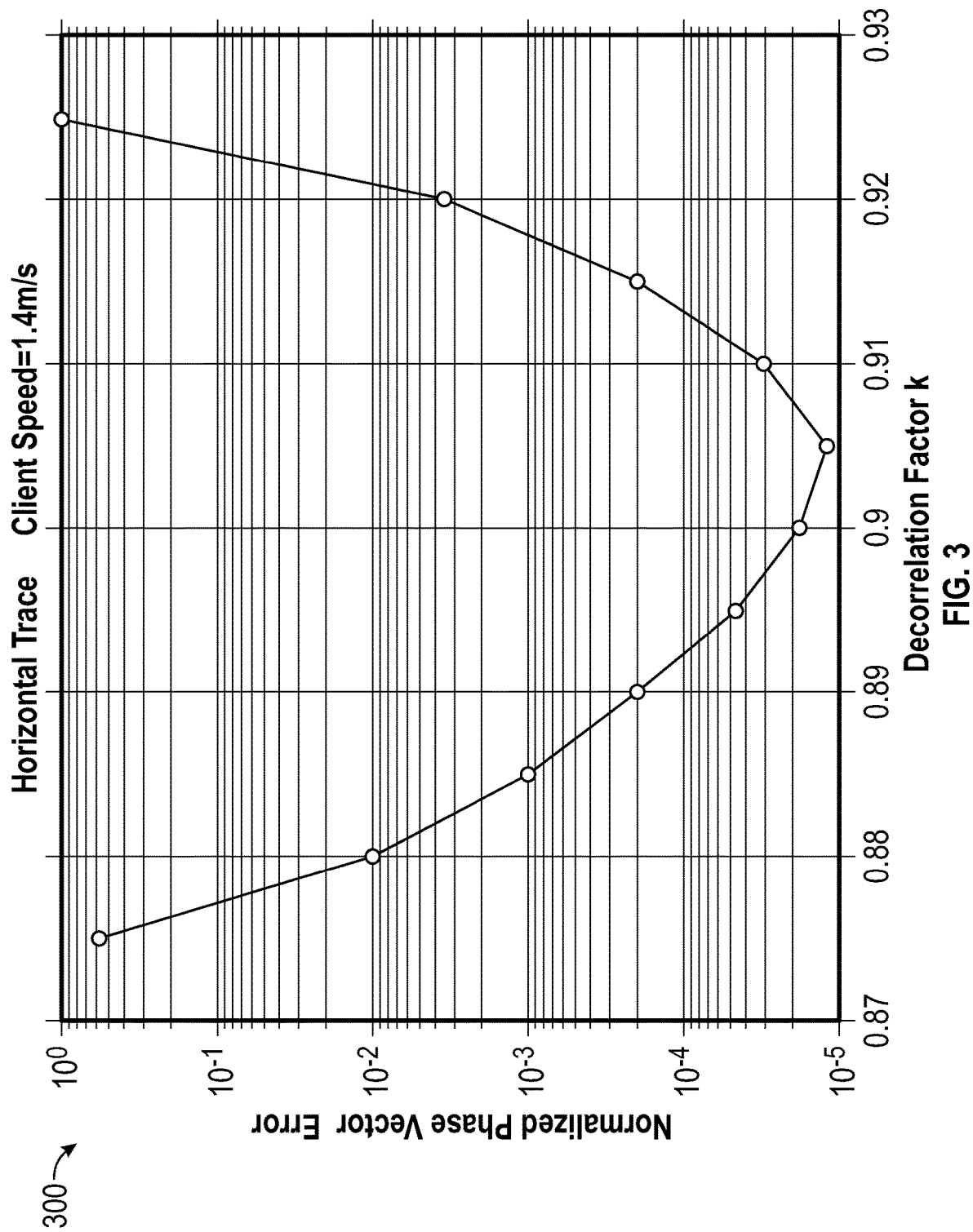
FIG. 3 illustrates a simulation for determining a decorrelation factor for mobility of a client device, according to one embodiment.

FIG. 3, for example, illustrates a simulation 300 that can be used to determine a decorrelation factor for a client device 102, according to one embodiment. Here, given a client device speed of 1.4 meters per second (m/s), the location component 106 can determine that the optimal decorrelation factor k is 0.907. Note, however, that this is merely an example and that other decorrelation factors can be determined for other client device speeds and AP deployments. The AP deployment for the simulation 300, for example, includes four APs each with an 8-element circular array antenna located at the four vertex of a square having an edge length of 30 meters. The origin of the 2-D coordinate system is located at the center of the square.

Figure 4:
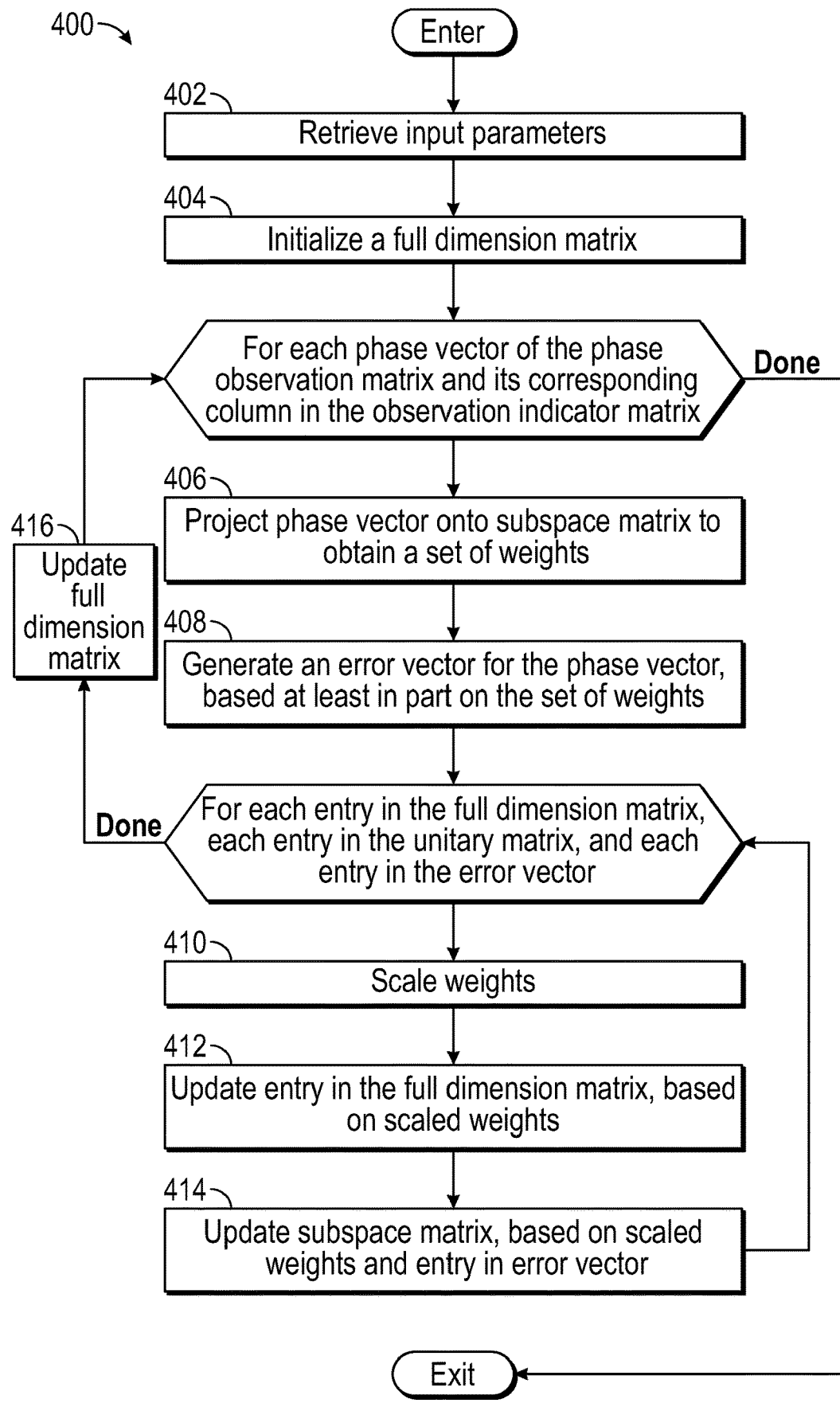
FIG. 4 is a flowchart of a method for performing a recursive phase vector subspace estimation, according to one embodiment.

FIG. 4 is a flowchart of a method 400 for performing a recursive phase vector subspace estimation, according to one embodiment. The method 400 may be performed by a location component (e.g., location component 106) of a master AP (e.g., AP 104E).

Method 400 may enter at block 402, where the location component retrieves a set of input parameters. For example, the input parameters can include the phase observation matrix Y (e.g., phase observation matrix 200), an observation indicator matrix M, an estimated phase vector subspace, a unitary matrix U, and a decorrelation factor k. In one embodiment, the estimated phase vector subspace may be returned from the last call of the method 400. The columns of the estimated phase vector subspace span the desired subspace of the unitary matrix U (also referred to as the subspace matrix U). The observation indicator matrix M may indicate which measurements of the phase observation matrix Y are observable. For example, the observation indicator matrix M may include a value of "1" for entries of the phase observation matrix Y that have a phase measurement (e.g., valid and/or erroneous) and a value of "0" for entries of the phase observation matrix Y that do not have a phase measurement (e.g., due to AP packet miss detection).

At block 404, the location component initializes a full dimension significance matrix R. For example, the location component may initialize the full dimension significance matrix to be an identity matrix or a matrix with all zeros except along the diagonal. The location component may then perform the operations in blocks 406, 408, 410, 412, and 414 for each phase vector y of the phase observation matrix Y and its corresponding column m in the observation indicator matrix M. At block 406, for example, the location component projects the respective phase vector y onto the subspace matrix U to obtain a set of weights a. In one embodiment, the set of weights a may be obtained using the following:

$$a = \text{pinv}(\text{diag}(m)U)(\text{diag}(m)y) \quad (1)$$

where pinv( ) is a function that returns the Moore-Penrose pseudoinverse of a matrix, diag( ) is a function that returns the diagonal elements of a matrix, y is the respective phase vector y (column of the phase observation matrix Y), and m is the corresponding column of the observation indicator matrix M. At block 408, the location component generates an error vector C for the phase vector y, based at least in part on the set of weights a. In one embodiment, the error vector C can be obtained using the following:

$$C = \text{diag}(m)y - \text{diag}(m)Ua \quad (2)$$

For each entry r in the full dimension matrix R, each entry u in the unitary matrix U, and each entry c in the error vector C, the location component may perform blocks 410, 412, and 414. At block 410, for example, the location component may scale the weights a to obtain scaled weights b, using the following:

$$b = ra \quad (3)$$

At block 412, the location component then updates the entry r in the full dimension matrix R, based on the scaled weights b. For example, the entry r in the full dimension matrix R can be updated using the following:

$$r = r - bb'/(k + a'ra) \quad (4)$$

At block 414, the location component then updates the subspace matrix U, based on the scaled weights b and entry c in the error vector C. For example, the subspace matrix U may be updated using the following:

$$u = u + (1/k)ca'r \quad (5)$$

After performing blocks 410, 412, and 414 for each entry r in the full dimension matrix R, each entry u in the unitary matrix U, and each entry c in the error vector C, the location component updates the full dimension matrix R (block 416). For example, the full dimension matrix R can be updated using the following:

$$R = R/k \quad (6)$$

Once each phase vector y of the phase observation matrix Y is evaluated, the method 400 exits.

Figure 5:
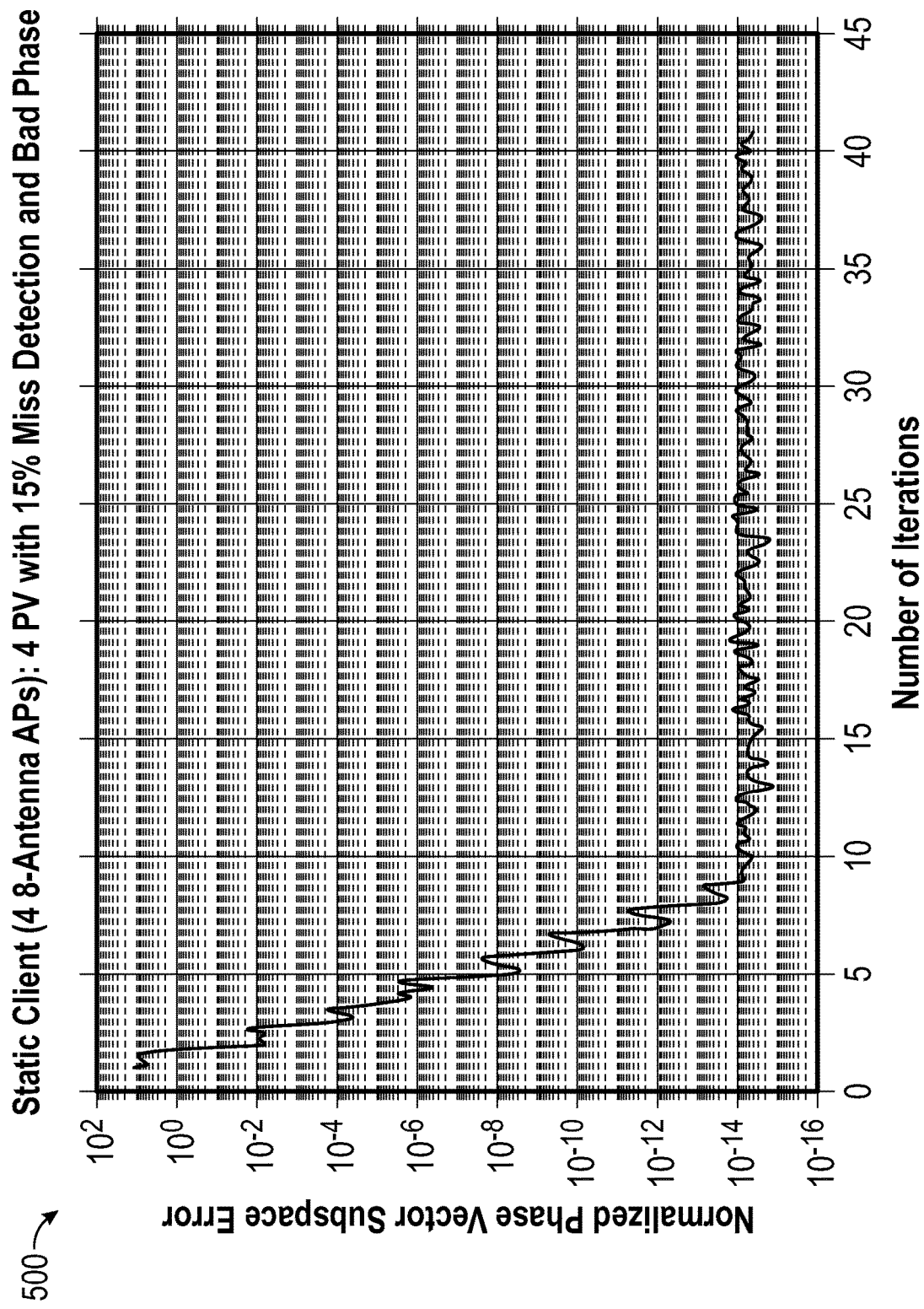
FIG. 5 illustrates a simulation of a recursive phase vector subspace estimation for a static client device, according to one embodiment.
Figure 6:
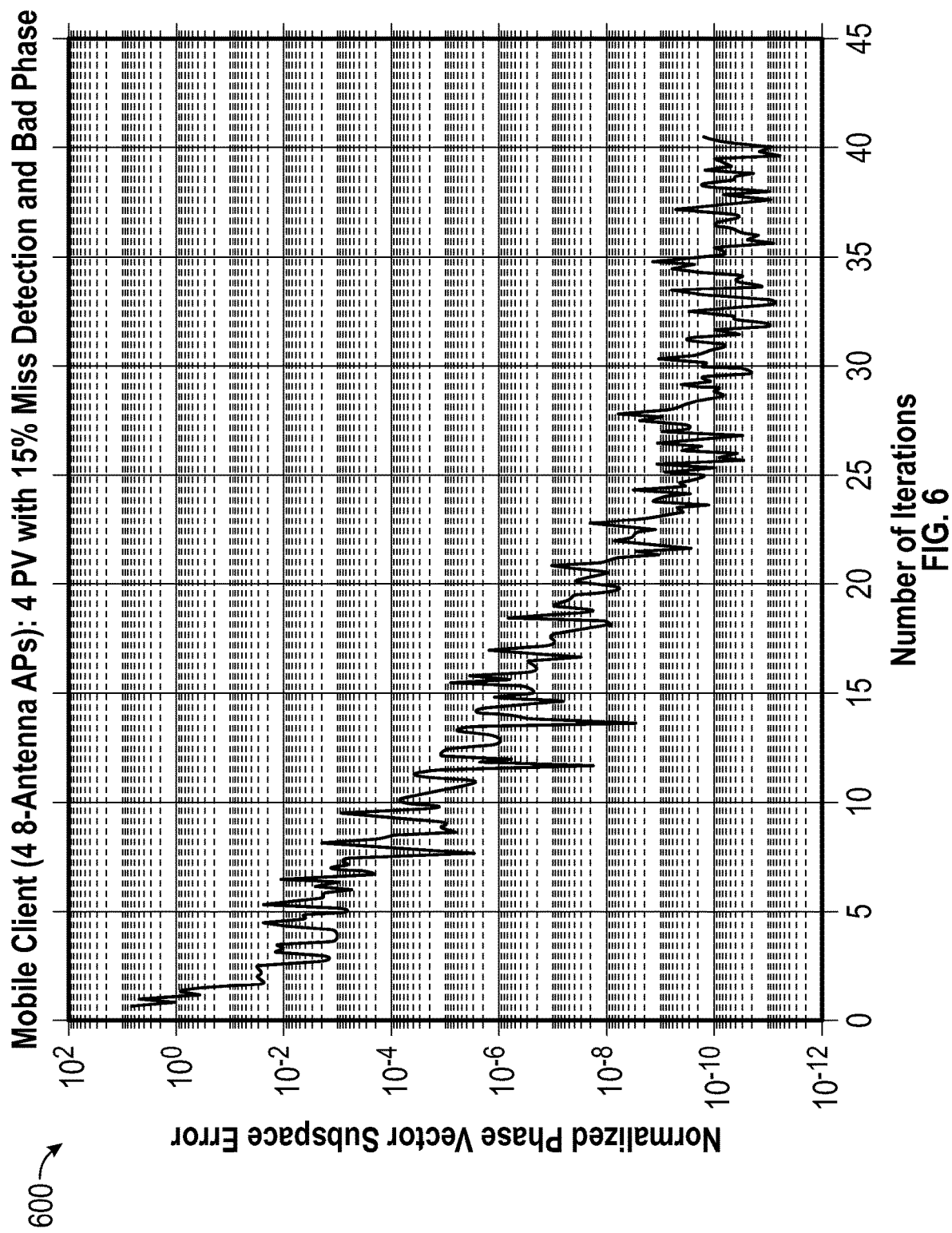
FIG. 6 illustrates a simulation of a recursive phase vector subspace estimation for a mobile client device, according to one embodiment.

By performing the recursive phase vector subspace estimation depicted in FIG. 4, embodiments can accurately obtain the desired (low-dimensional) underlying phase vector subspace using a smaller number of observed phase vectors (relative to conventional techniques). FIG. 5, for example, illustrates a simulation 500 of the recursive phase vector subspace estimation described herein for a static client device, according to one embodiment. Here, for a static client device with four phase vector measurements, the normalized phase vector subspace error (e.g., F-norm of the subspace matrix difference divided by F-norm of the true subspace matrix) reaches $10^{-6}$ within approximately five iterations. FIG. 6 illustrates another simulation 600 of the recursive phase vector subspace estimation described herein for a mobile client device, according to one embodiment. Here, for a mobile client device with four phase vector measurements, the normalized phase vector subspace error reaches $10^{-6}$ within approximately twelve iterations.

Figure 7:
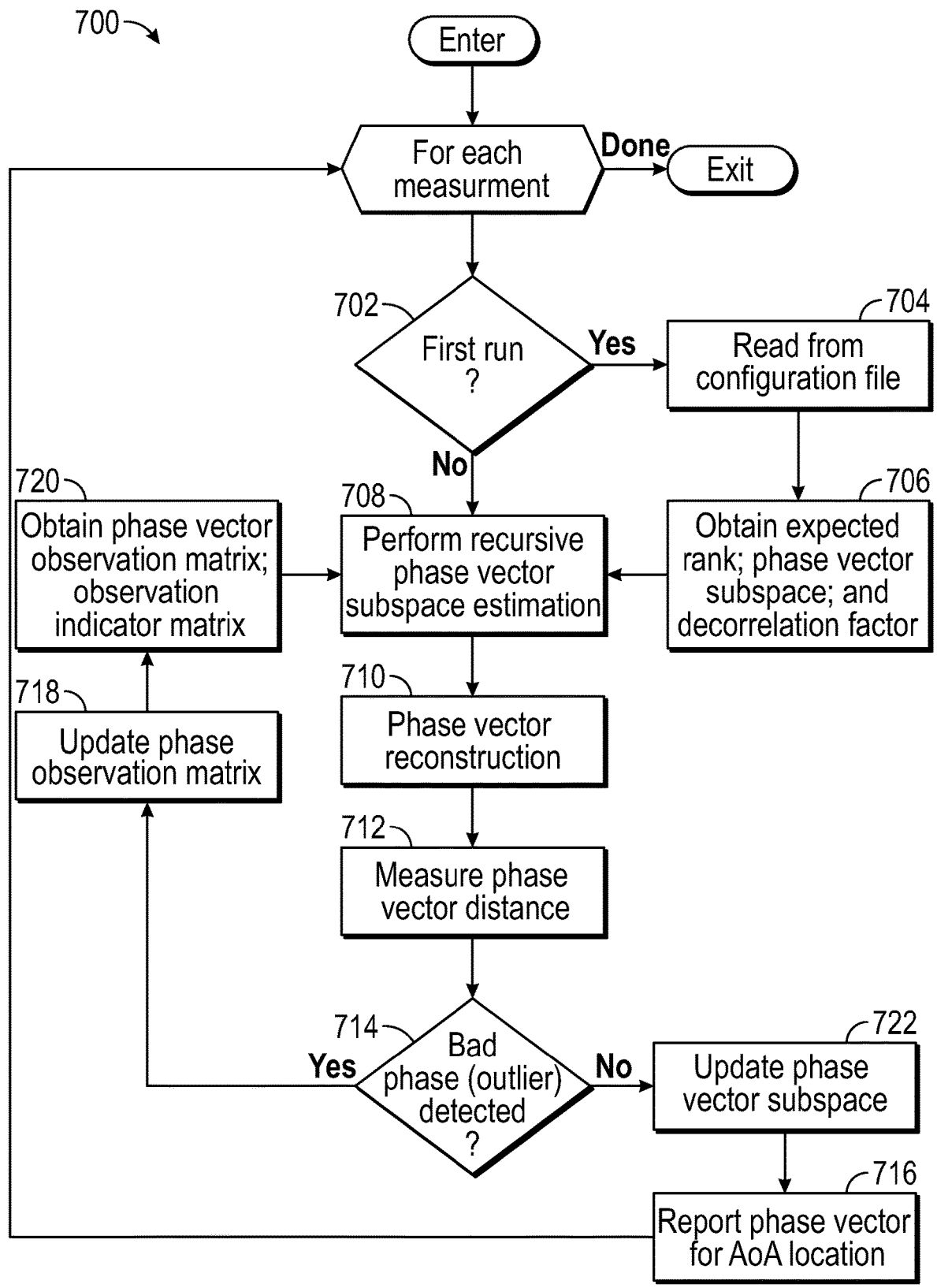
FIG. 7 is a flowchart of a method for determining a location of a client device using a recursive phase vector subspace estimation, according to one embodiment.

FIG. 7 is a flowchart of a method 700 for determining a location of a client device using a recursive phase vector subspace estimation, according to one embodiment. In one embodiment, the method 700 may be used to perform AoA localization. The method 700 may be performed by a location component (e.g., location component 106) of a master AP (e.g., AP 104E), e.g., using AoA measurements reported by one or more APs (e.g., APs 104 A-D). The method 700 may be performed for each new measurement reported by an AP.

Method 700 may enter at block 702, where the location component determines whether the method 700 is being performed for an initial time (e.g., first run). If so, the location component reads from a configuration file (block 704) and obtains, from the configuration file, the expected rank, the phase vector subspace, and the decorrelation factor (block 706). If the location component determines at block 702 that the method 700 is not being performed for the initial time, the location component proceeds to block 708.

At block 708, the location component performs a recursive phase vector subspace estimation, e.g., using the method 400 illustrated in FIG. 4. At block 710, the location component generates a reconstructed phase vector (e.g., an estimated AoA measurement), based on the recursive phase vector subspace estimation. At block 712, the location component measures the phase vector distance between the reconstructed phase vector and the measured phase vector (e.g., AoA measurement). In general, the location component determines a difference between the reconstructed phase vector and the measured phase vector. At block 714, the location component determines whether a base phase (or outlier) is detected. In one embodiment, the location component may determine that a base phase is detected if the phase vector distance (or difference) satisfies a condition (e.g., is greater than (or equal to) a threshold). On the other hand, the location component may determine that a base phase is not detected if the phase vector distance (or difference) does not satisfy the condition.

If the location component detects a bad phase, then the location component updates the phase observation matrix (block 718). In one embodiment, the location component can update the phase observation matrix by removing the entry corresponding to the bad phase (outlier). At block 720, the location component obtains the (updated) phase vector observation matrix and the corresponding (updated) observation indicator matrix, and then proceeds to block 708.

If the location component does not detect a bad phase, then the location component updates the phase vector subspace (block 722) (e.g., to be used for the next iteration through method 700 for a new measurement). At block 716, the location component reports the phase vector for AoA location. The method 700 may exit once all measurements have been received.

By performing method 700 for each time there is a newly measured phase vector available, embodiments can reconstruct a new phase vector (based on a calculated subspace matrix) and compare it to the original input phase vector to see whether there are any outlier entries present in the input phase vector. If there is an outlier entry, embodiments can infer that the subspace matrix contains invalid contributions from the bad phase measurement, and embodiments can remove the outlier entries and treat them as missing entries in the next call to the recursive phase vector subspace estimation algorithm.

Figure 8:
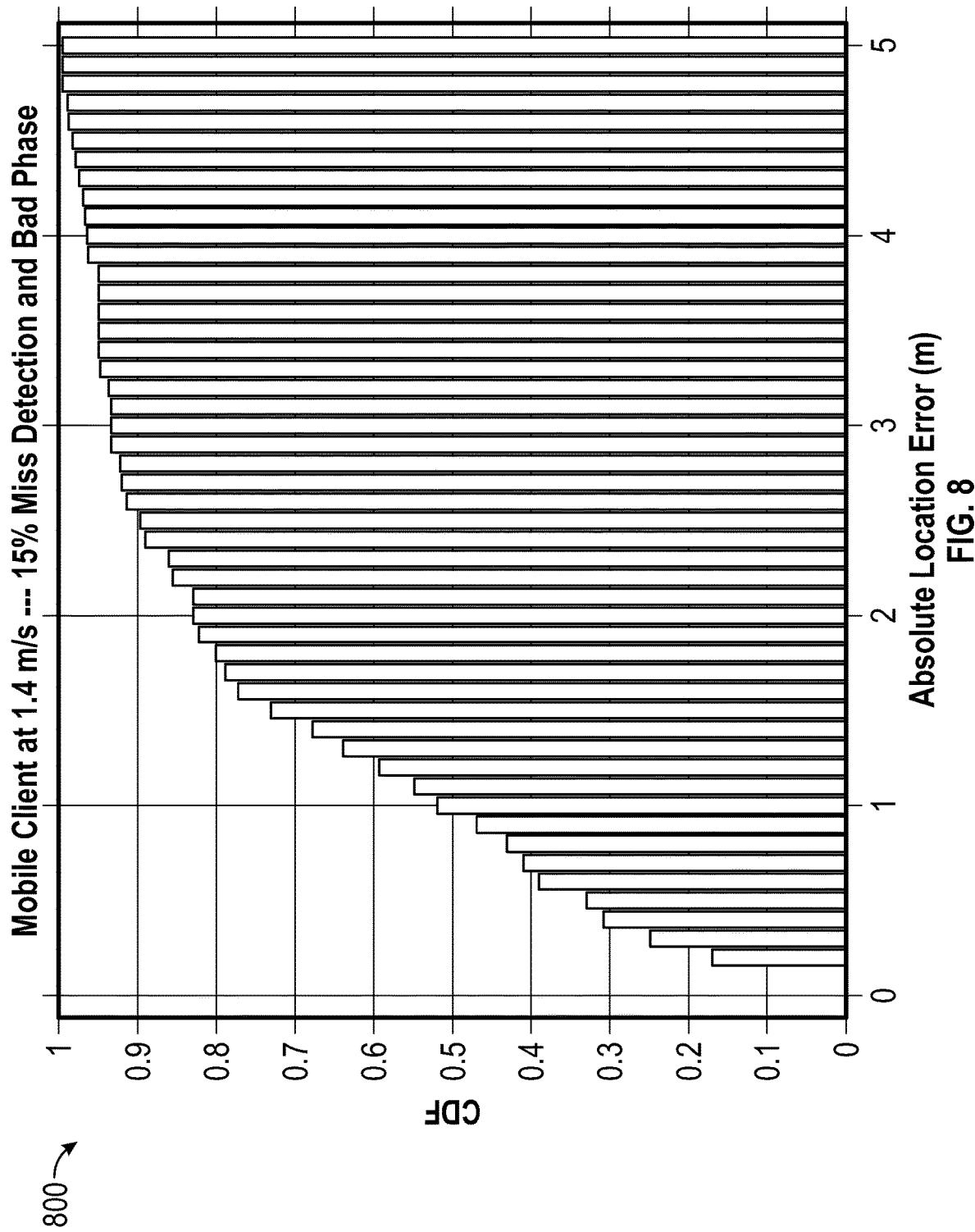
FIG. 8 illustrates a simulation of location accuracy when determining the location of a mobile client device, according to one embodiment.

FIG. 8 illustrates a simulation 800 of location accuracy when determining the location of a mobile client device using the techniques described herein, according to one embodiment. In this particular example, simulation 800 assumes that the speed of the client device is 1.4 m/s, the SNR at each AP is fixed to a particular value (e.g., 20 dB) regardless of the Tx-Rx distance, the phase vectors are measured 10 times per second, and the probability of packet miss detection for each antenna state is 15%. Additionally, the occurrences of the packet miss detection are independent from each other (e.g., random). As shown, given a mobile client device moving at a speed of 1.4 m/s and a 15% random packet miss detection and bad phase measurement at each AP antenna state, embodiments can reach a location accuracy of 1 meter at 50% probability and 3 meters at 90% probability.

Figure 9:
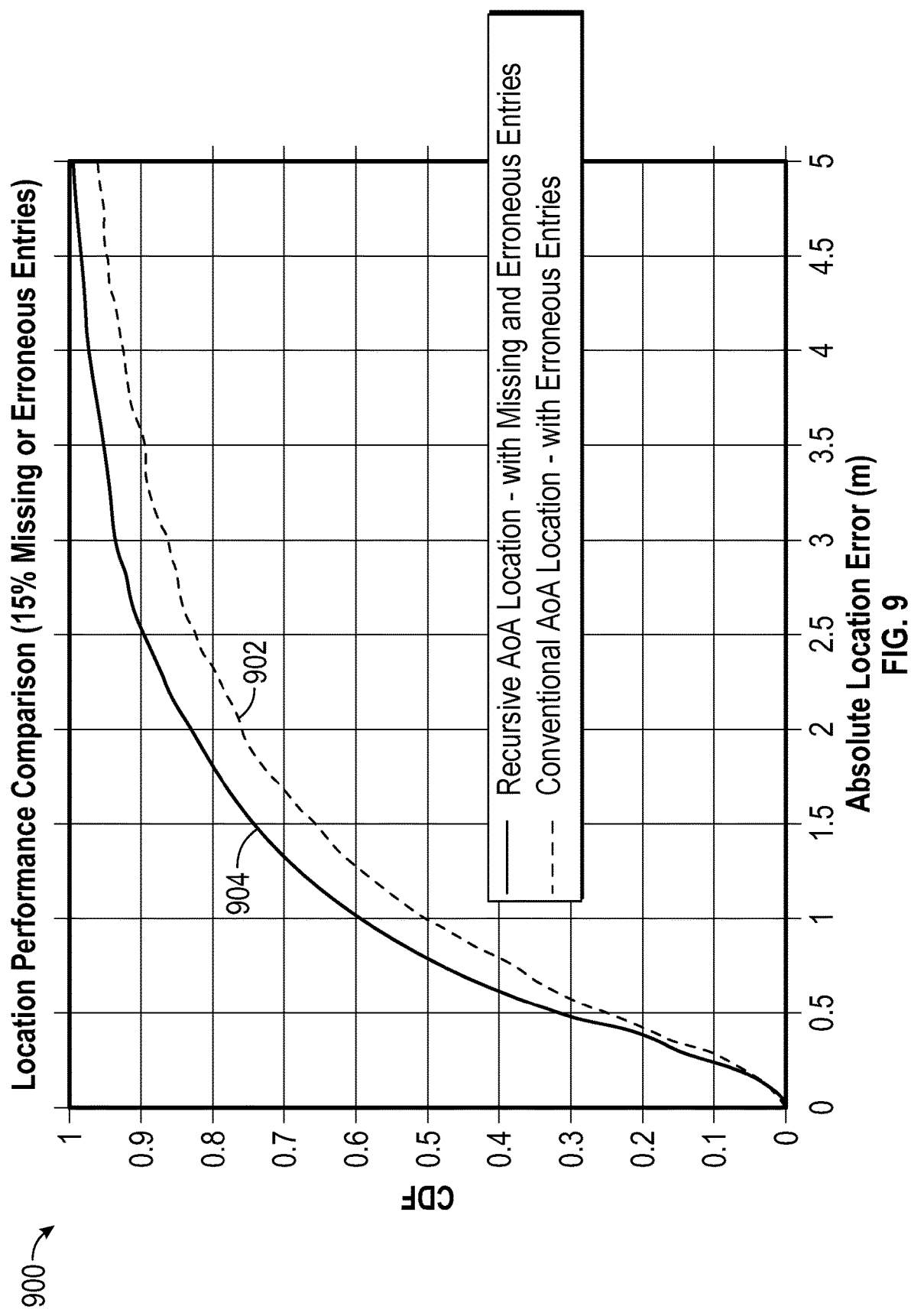
FIG. 9 illustrates a simulation of the performance comparison between AoA location procedures, according to one embodiment.

FIG. 9 illustrates a simulation 900 of the performance comparison between a conventional AoA location procedure and the AoA-location technique (based on iterative recursive phase vector estimation) described herein, according to one embodiment. Here, line 902 represents the location performance of the conventional AoA location procedure in terms of location error distribution. As noted, the conventional AoA location procedure may involve obtaining the phase vectors through direct SVD over the observed phase vector matrix with erroneous entries. Line 904, on the other hand, represents the location performance of the AoA-location technique (based on iterative recursive phase vector estimation) described herein. The AoA-location technique described herein can be performed with both missing and erroneous entries. As shown, for example, the performance of the AoA-location technique (based on iterative recursive phase vector estimation) with both missing and erroneous entries is significantly improved relative to the performance of the conventional AoA location procedure with erroneous entries.

Figure 10:
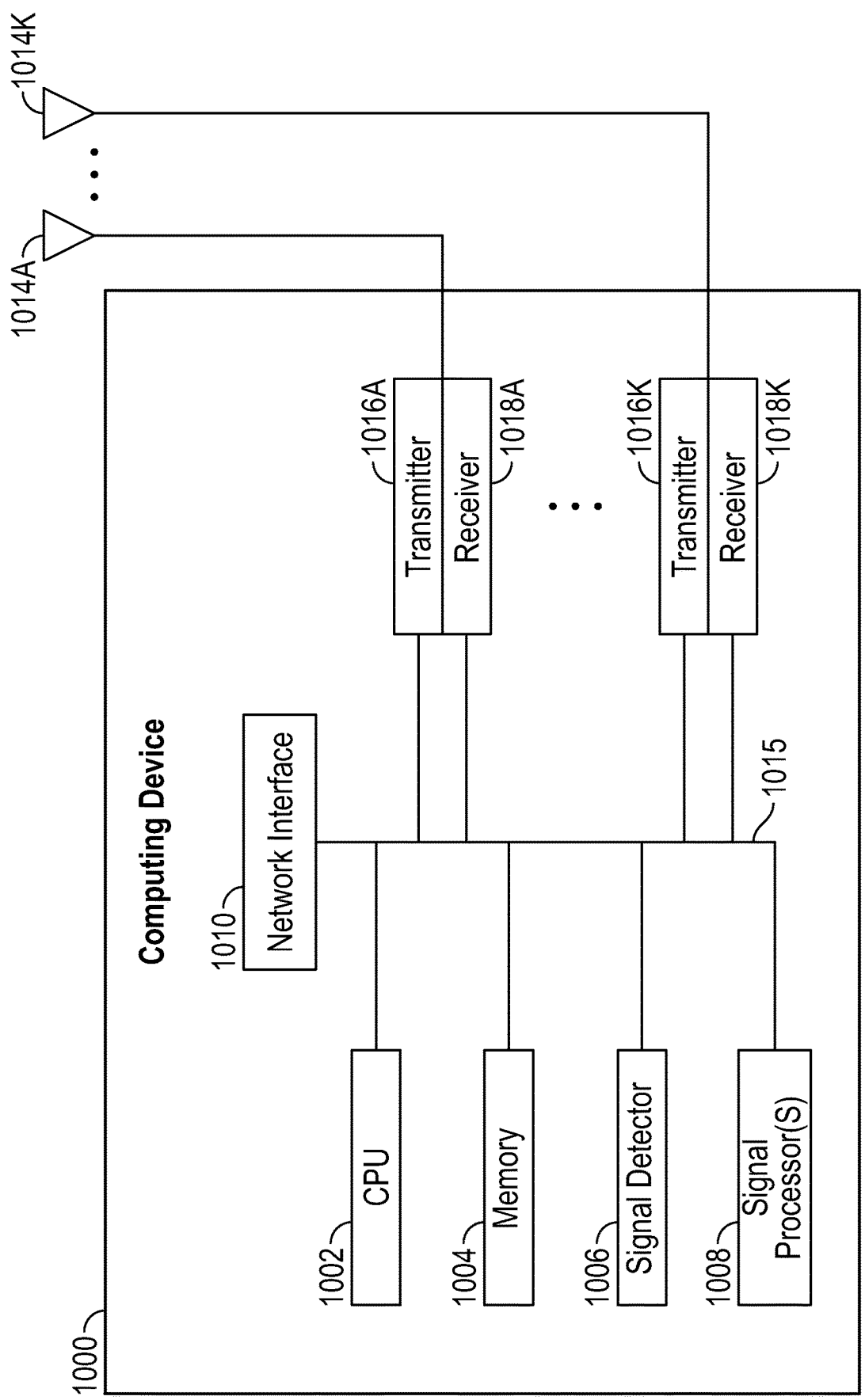
FIG. 10 illustrates an example computing device, according to one embodiment.

FIG. 10 illustrates various components that may be utilized in a computing device 1000 that may be employed within the wireless network 100. In one embodiment, the computing device 1000 is an example of a wireless device that can implement the various techniques described herein. For example, the computing device 1000 can perform method 400 and method 700. The computing device 1000 can be an AP (e.g., AP 104), a central controller, or a master AP (e.g., AP 104E).

As shown, the computing device 1000 includes, without limitation, a central processing unit (CPU) 1002, a network interface 1010, a memory 1004, a signal detector 1006, and signal processor(s) 1008, each connected to a bus 1015. The computing device 1000 also includes transmitters 1016 A-K and receivers 1018 A-K to allow transmission and reception of data between the computing device 1000 and other device(s). Each transmitter 1016 and receiver 1018 can be combined into a transceiver. Multiple antennas 1014 A-K are electrically coupled to the transmitters 1016 A-K and receivers 1018 A-K. The computing device 1000 is configured to perform MIMO (e.g., MU-MIMO, single-user (SU)-MIMO) and beamforming techniques, using the multiple antennas 1014 A-K.

The CPU 1002 generally controls operation of the computing device 1000. For example, the CPU 1002 retrieves and executes programming instructions stored in the memory 1004 as well as stores and retrieves application data residing in the memory 1004. The memory 1004, which may include both read-only memory (ROM) and random access memory (RAM), provides instructions and data to the CPU 1002. A portion of the memory 1004 also may include non-volatile random access memory (NVRAM). The instructions in the memory 1004 are executable to implement the techniques described herein. For example, in one embodiment, the memory 1004 may include the location component 106, described in more detail above. Note CPU 1002 is included to be representative of a single CPU, multiple CPUs, a single CPU having multiple processing cores, and the like.

The computing device 1000 can use the signal detector 1006 to detect and quantify the level of signals received by the receivers 1018 A-K. The signal detector 1006 may detect such signals as total energy, energy per subcarrier per symbol, power spectral density and other signals. The computing device 1000 can use the signal processor(s) 1008 (e.g., digital signal processor(s) (DSP(s)) in processing signals. For example, the signal processor(s) 1008 can perform transmit signal processing of signals to be transmitted via the plurality of antennas 1014 A-K, and perform receive processing of signals that are received by the plurality of antennas 1014 A-K.

The various components of the computing device 1000 may be coupled together by a bus system 1015, which may include a power bus, a control signal bus, and a status signal bus in addition to a data bus. The network interface 1010 can be used as a wired network interface, e.g., to connect to another network via a wired medium.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method performed by an apparatus, the computer-implemented method comprising:
obtaining a plurality of phase vectors from a plurality of fixed access points (APs), each of the plurality of phase vectors comprising a plurality of entries for phase values measured from a signal received from a client device at the plurality of fixed APs;
identifying at least a first phase vector of the plurality of phase vectors that comprises at least one of: (i) one or more entries with missing phase values or (ii) one or more entries with erroneous phase values, based on performing a first recursive phase estimation using the plurality of phase vectors;
generating a first updated plurality of phase vectors based on removing, from the first phase vector, at least one of (i) the one or more entries with missing phase values or (ii) the one or more entries with erroneous phase values;
identifying at least a second phase vector of the plurality of phase vectors that comprises at least one of (i) one or more entries with missing phase values or (ii) one or more entries with erroneous phase values, based on performing a second recursive phase estimation using the first updated plurality of phase vectors;
generating a second updated plurality of phase vectors, based on the identified second phase vector; and
determining a location of the client device, based on the second updated plurality of phase vectors.

2. A computing system, comprising:
a processor; and
a memory storing a program executable by the processor to perform an operation, the operation comprising:
obtaining a plurality of phase vectors from a plurality of fixed access points (APs), each of the plurality of phase vectors comprising a plurality of entries for phase values measured from a signal received from a client device at the plurality of fixed APs;
identifying at least a first phase vector of the plurality of phase vectors that comprises at least one of: (i) one or more entries with missing phase values or (ii) one or more entries with erroneous phase values, based on performing a first recursive phase estimation using the plurality of phase vectors;
generating a first updated plurality of phase vectors based on the removing, from the first phase vector, at least one of (i) the one or more entries with missing phase values or (ii) the one or more entries with erroneous phase values;
identifying at least a second phase vector of the plurality of phase vectors that comprises at least one of (i) one or more entries with missing phase values or (ii) one or more entries with erroneous phase values, based on performing a second recursive phase estimation using the first updated plurality of phase vectors;
generating a second updated plurality of phase vectors, based on the identified second phase vector; and
determining a location of the client device, based on the second updated plurality of phase vectors.

3. A non-transitory computer readable medium having program instructions embodied therewith, the program instructions executable by a processor to perform an operation, the operation comprising:
obtaining a plurality of phase vectors from a plurality of fixed access points (APs), each of the plurality of phase vectors comprising a plurality of entries for phase values measured from a signal received from a client device at the plurality of fixed APs;
identifying at least a first phase vector of the plurality of phase vectors that comprises at least one of: (i) one or more entries with missing phase values or (ii) one or more entries with erroneous phase values, based on performing a first recursive phase estimation using the plurality of phase vectors;
generating a first updated plurality of phase vectors based on the removing, from the first phase vector, at least one of (i) the one or more entries with missing phase values or (ii) the one or more entries with erroneous phase values;
identifying at least a second phase vector of the plurality of phase vectors that comprises at least one of (i) one or more entries with missing phase values or (ii) one or more entries with erroneous phase values, based on performing a second recursive phase estimation using the first updated plurality of phase vectors;
generating a second updated plurality of phase vectors, based on the identified second phase vector; and
determining a location of the client device, based on the second updated plurality of phase vectors.

4. The non-transitory computer readable medium of claim 3, wherein performing the first recursive phase estimation comprises:
reconstructing an estimated phase vector corresponding to the first phase vector;
determining a difference between the first phase vector and the estimated phase vector; and
determining the first phase vector comprises at least one of (i) the one or more entries with missing phase values or (ii) the one or more entries with erroneous phase values, when the difference is above a threshold difference.

5. The non-transitory computer readable medium of claim 3, wherein performing the second recursive phase estimation comprises:
reconstructing an estimated phase vector corresponding to the second phase vector;
determining a difference between the second phase vector and the estimated phase vector; and
determining the second phase vector comprises at least one of (i) the one or more entries with missing phase values or (ii) the one or more entries with erroneous phase values, when the difference is above a threshold difference.

6. The non-transitory computer readable medium of claim 5, wherein determining the location of the client device comprises using at least the estimated phase vector to determine the location of the client device, when a difference between the second phase vector and the estimated phase vector is below a threshold difference.

7. The non-transitory computer readable medium of claim 5, wherein:
the estimated phase vector comprises one or more corresponding entries to the one or more entries of the second phase vector with missing phase values; and
the one or more corresponding entries comprise estimated phase values.

8. The non-transitory computer readable medium of claim 5, wherein:
the estimated phase vector comprises one or more corresponding entries to the one or more entries of the second phase vector with erroneous phase values; and
the one or more corresponding entries comprise estimated phase values.

9. The non-transitory computer readable medium of claim 3, wherein generating the second updated plurality of phase vectors comprises removing, from the second phase vector, at least one of (i) the one or more entries with missing phase values or (ii) the one or more entries with erroneous phase values.

10. The computer-implemented method of claim 1, wherein performing the first recursive phase estimation comprises:
reconstructing an estimated phase vector corresponding to the first phase vector;
determining a difference between the first phase vector and the estimated phase vector; and
determining the first phase vector comprises at least one of (i) the one or more entries with missing phase values or (ii) the one or more entries with erroneous phase values, when the difference is above a threshold difference.

11. The computer-implemented method of claim 1, wherein performing the second recursive phase estimation comprises:
reconstructing an estimated phase vector corresponding to the second phase vector;
determining a difference between the second phase vector and the estimated phase vector; and
determining the second phase vector comprises at least one of (i) the one or more entries with missing phase values or (ii) the one or more entries with erroneous phase values, when the difference is above a threshold difference.

12. The computer-implemented method of claim 11, wherein determining the location of the client device comprises using at least the estimated phase vector to determine the location of the client device, when a difference between the second phase vector and the estimated phase vector is below a threshold difference.

13. The computer-implemented method of claim 11, wherein:
the estimated phase vector comprises one or more corresponding entries to the one or more entries of the second phase vector with missing phase values; and
the one or more corresponding entries comprise estimated phase values.

14. The computer-implemented method of claim 11, wherein:
the estimated phase vector comprises one or more corresponding entries to the one or more entries of the second phase vector with erroneous phase values; and
the one or more corresponding entries comprise estimated phase values.

15. The computer-implemented method of claim 1, wherein generating the second updated plurality of phase vectors comprises removing, from the second phase vector, at least one of (i) the one or more entries with missing phase values or (ii) the one or more entries with erroneous phase values.

16. The computing system of claim 2, wherein performing the first recursive phase estimation comprises:
reconstructing an estimated phase vector corresponding to the first phase vector;
determining a difference between the first phase vector and the estimated phase vector; and
determining the first phase vector comprises at least one of (i) the one or more entries with missing phase values or (ii) the one or more entries with erroneous phase values, when the difference is above a threshold difference.

17. The computing system of claim 2, wherein performing the second recursive phase estimation comprises:
reconstructing an estimated phase vector corresponding to the second phase vector;
determining a difference between the second phase vector and the estimated phase vector; and
determining the second phase vector comprises at least one of (i) the one or more entries with missing phase values or (ii) the one or more entries with erroneous phase values, when the difference is above a threshold difference.

18. The computing system of claim 17, wherein determining the location of the client device comprises using at least the estimated phase vector to determine the location of the client device, when a difference between the second phase vector and the estimated phase vector is below a threshold difference.

19. The computing system of claim 17, wherein:
the estimated phase vector comprises one or more corresponding entries to the one or more entries of the second phase vector with missing phase values; and
the one or more corresponding entries comprise estimated phase values.

20. The computing system of claim 17, wherein:
the estimated phase vector comprises one or more corresponding entries to the one or more entries of the second phase vector with erroneous phase values; and
the one or more corresponding entries comprise estimated phase values.

21. The computing system of claim 2, wherein generating the second updated plurality of phase vectors comprises removing, from the second phase vector, at least one of (i) the one or more entries with missing phase values or (ii) the one or more entries with erroneous phase values.

* * * * *